United States Patent
Audouin et al.

(10) Patent No.: US 6,744,496 B2
(45) Date of Patent: Jun. 1, 2004

(54) METHOD OF MEASURING THE ERROR RATE OF AN OPTICAL TRANSMISSION SYSTEM AND APPARATUS FOR IMPLEMENTING THE METHOD

(75) Inventors: Olivier Audouin, Savigny sur Orge (FR); Maria Manzanedo, Elda (ES); Ludovic Noirie, Nozay (FR); Denis Penninckx, Nozay (FR); Albert Benveniste, Rennes (FR); Frederic Cerou, Rennes (FR); George Moustakides, Rennes Cedex (FR)

(73) Assignees: Alcatel, Paris (FR); Inria, Le Chesnay (FR)

( * ) Notice: Subject to any disclaimer, the term of this patent is extended or adjusted under 35 U.S.C. 154(b) by 0 days.

(21) Appl. No.: 10/267,573

(22) Filed: Oct. 10, 2002

(65) Prior Publication Data

US 2003/0117613 A1 Jun. 26, 2003

(30) Foreign Application Priority Data

Oct. 11, 2001 (FR) .............................. 01 13103

(51) Int. Cl.⁷ .............................................. G01N 21/00
(52) U.S. Cl. ...................................................... 356/73.1
(58) Field of Search ................. 356/73.1; 398/140–172, 398/182–201; 371/5.1, 5.2, 20.1; 375/355, 214, 286, 350

(56) References Cited

U.S. PATENT DOCUMENTS

| 5,870,211 A | * | 2/1999 | Yoshida ........................ 398/27 |
| 2001/0004392 A1 | * | 6/2001 | Stek et al. ................... 375/350 |

FOREIGN PATENT DOCUMENTS

| EP | 0920150 A2 | 6/1999 |
| EP | 0999670 A2 | 5/2000 |
| WO | WO 0120452 A1 | 3/2001 |

* cited by examiner

Primary Examiner—Tu T. Nguyen
(74) Attorney, Agent, or Firm—Sughrue Mion, PLLC

(57) ABSTRACT

A method of measuring the error rate of an optical transmission system transmitting a signal by
  detecting the signal, and
  asynchronously sampling the signal at a frequency independent of the bit rate of the signal to obtain K samples of the signal at respective times $t_1$ to $t_K$, where K is an integer greater than or equal to 2.
The eye diagram of the signal,
the error rate of the signal and the bit time of the signal are then computed.

12 Claims, 1 Drawing Sheet

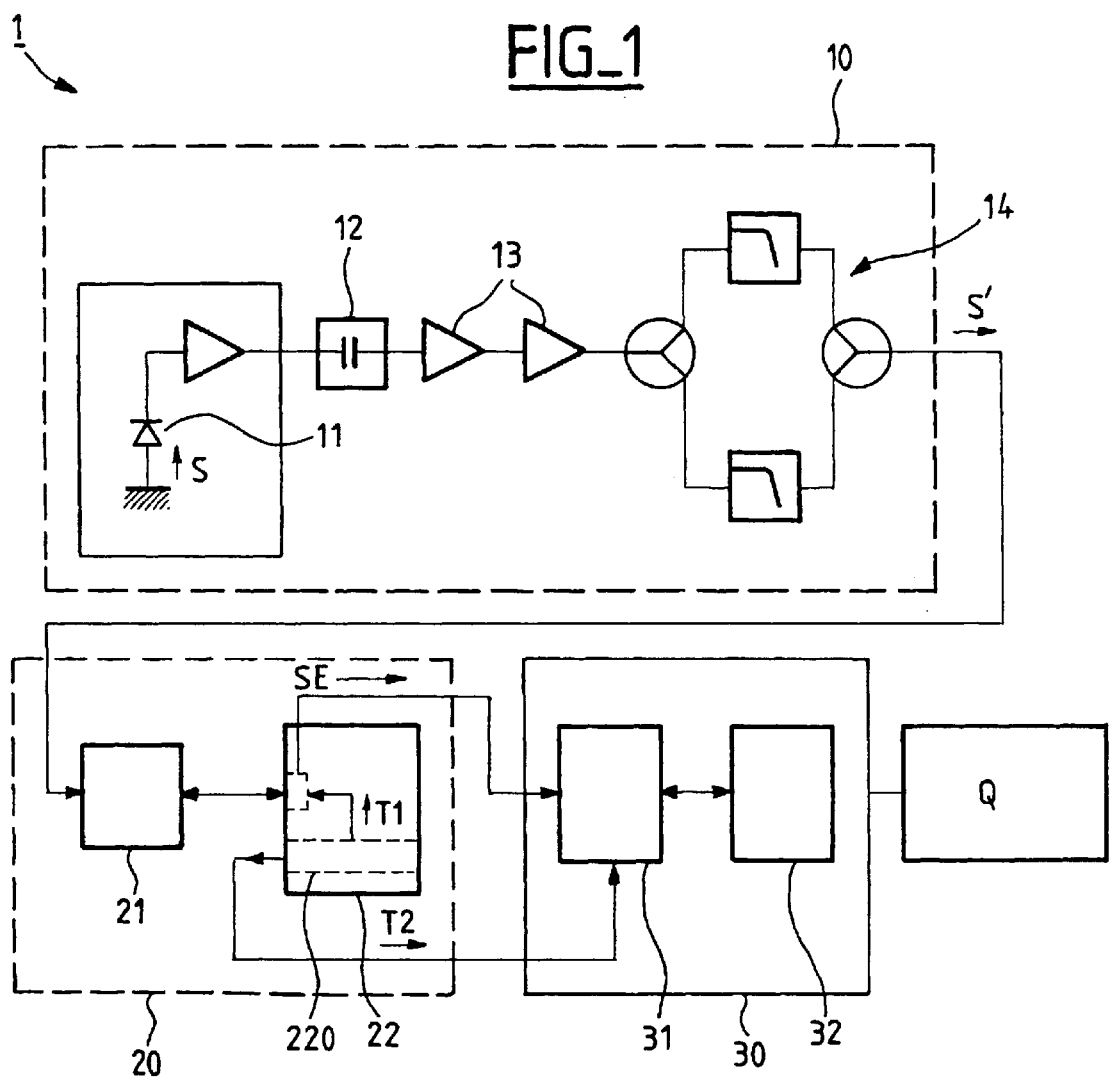
FIG_1
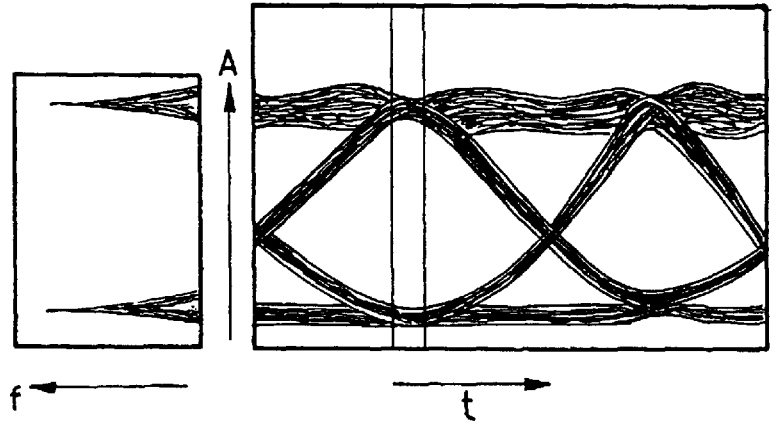
FIG_2

METHOD OF MEASURING THE ERROR RATE OF AN OPTICAL TRANSMISSION SYSTEM AND APPARATUS FOR IMPLEMENTING THE METHOD

FIELD OF THE INVENTION

The present invention relates to a method of measuring the error rate of an optical transmission system and apparatus for implementing the method.

Optical networks are increasingly used nowadays in high bit rate transmission systems. Optical networks provide functions, such as switching, that are transparent, i.e. independent of the electrical signal transmitted, and thus offer the flexibility required in modern telecommunication networks.

DESCRIPTION OF RELATED ART

However, this transparency necessitates verifying that the signal transmitted conforms to what is required, in particular in terms of transmission quality. It is therefore essential to have transparent means for determining the quality of the signal transmitted independently of the format of the signal, in particular its transmission bit rate and its type of modulation, in order to be able to measure the quality of optical transmission over any type of network (backbone network, MAN, LAN, etc.) regardless of its data format (SONET, SDH, IP over WDM, Giga-Ethernet, etc.) and its bit rate (622 Mbit/s, 2.5 Gbit/s, 10 Gbit/s, etc.).

There are many causes of signal degradation in optical networks. They include amplified spontaneous emission (ASE) by amplifiers, chromatic dispersion generating intersymbol interference (ISI), out-band crosstalk (linked to an adjacent channel) and in-band crosstalk (caused by an interfering wave at the same wavelength as that measured). These causes of degradation are additional to non-linear effects such as the Kerr, Brillouin, and Raman effects.

The principal quality criterion of a digital optical network is its bit error rate (BER), which is defined as the probability of the receiver detecting an erroneous bit. Because of noise, the signal received at the receiver fluctuates around an average value $I_1$ (if a 1 was transmitted) or $I_0$ (if a 0 was transmitted). It is assumed that the distribution is Gaussian in both cases. The distribution of the 1 level therefore has as its parameters $I_1$ and the variance $\sigma^2_1$, while the distribution of the 0 level has as its parameters $I_0$ and the variance $\sigma^2_0$. To decide if a value received by the receiver is correct, it is necessary to impose a decision threshold $I_D$. A bit sent at 1 is considered to be correct if $I>I_D$ and a bit sent at 0 is considered to be correct if $I<I_D$ In other words, an error has occurred if $I<I_D$ for a bit sent at 1 or if $I>I_D$ for a bit sent at 0. In practice, $I_D$ is optimized to minimize the BER.

The BER is defined by the equation:

$$BER = \frac{\exp(-Q^2/2)}{Q \cdot \sqrt{2 \cdot \pi}}$$

in which Q, referred to as the quality factor, is defined by the equation:

$$Q = \frac{I_1 - I_0}{\sigma_0 - \sigma_1}$$

A method of determining the quality of an optical signal independently of the format of the signal by using relative error rate measurements is already available.

This method, described in the document "Field Trial over 750 km long transparent WDM link using an adaptive 10 Gb/s receiver with non-intrusive monitoring capability", S. Herbst et al., OFC 2001 (paper ML2-1), for example, is based on measuring the amplitude of the detected electrical signal by using an exclusive-OR function to compare the decisions of two bistables, one operating at the optimum threshold $I_D$ (optimum amplitude from which the signal is considered to be equal to 1) and the other operating with a variable amplitude threshold. The difference between the signals from the two bistables, referred as the pseudo-error, is logged each time that the two measurements are different. Assuming a Gaussian distribution of the levels, extrapolating the pseudo-error rate curves as a function of the position of the variable amplitude threshold provides an evaluation of the BER at the optimum threshold.

The above method is intrinsically transparent to the format of the signal transmitted. However, it necessitates the use of a clock recovery circuit and a variable delay line for phase adjustment. These components introduce a non-negligible cost factor and additionally limit the transparency of the method because they cannot be tuned over a wide range of signal bit rates.

Another method of solving this problem, known as the histogram method, is also available. This method applies asynchronous sampling to the transmitted signal, so that the sampling is independent of the bit rate of the signal, after which all of the samples are placed on the amplitude axis. A histogram representing the number of samples as a function of amplitude is then extracted. Then, after eliminating problematical points using a heuristic method, an estimate is derived from the histogram using two Gaussian distributions to determine the Q factor and then the BER.

That method is not always satisfactory. It provides only a qualitative evaluation of the error rate, because the results that it supplies are not reliable.

BRIEF SUMMARY OF THE INVENTION

An object of the present invention is therefore to provide a method of measuring the error rate of an optical transmission system that is transparent not only to the format of the transmitted signal but also to the signal transmission bit rate, and which necessitates the use of components that are less costly than the prior art method.

To this end, the present invention proposes a method of measuring the error rate of an optical transmission system transmitting a signal, said method comprising the following operations:

detecting said signal, asynchronously sampling said signal at a frequency independent of the bit rate of said signal to obtain K samples of said signal at respective times $t_1$ to $t_K$ where K is an integer greater than or equal to 2, computing the eye diagram of said signal, and computing the error rate of said signal, which method is characterized in that, after sampling said signal, it further comprises an operation of computing the bit time of said signal.

The method of the invention solves the problem caused by the prior art methods using asynchronous sampling, namely the inaccuracy of the result. The method of the invention computes the bit time so that the same advantages are obtained as with a synchronous method using a physical clock recovery system, but the clock recovery system is no longer necessary. The method of the invention is also transparent to the transmission bit rate.

By means of the invention, the eye diagram can be reconstructed without knowing the bit rate, i.e. without knowing the real bit time of the optical signal, because it is computed from the signal sampled asynchronously.

Furthermore, asynchronous sampling of the received optical signal guarantees that the method of the invention is transparent to the type of modulation. The asynchronous sampling can be carried out at a frequency very much lower than the bit rates used, which means that it is not synchronized to the signal.

Computing the bit time of the signal is an essential step for reconstituting the eye diagram when the sampling is asynchronous.

Note that, in the context of the invention, the expression "bit time" is used both for the absolute bit time and for the bit time relative to the sampling frequency.

In a first implementation of the method of the invention, the absolute bit time is computed from an approximate value To known initially.

To this end, simultaneous computation of the bit time and the eye diagram comprises the following operations:

choosing a sub-sample of K/N samples of said signal where N is an integer power of 2, separating said sub-sample into two parts, computing two eye diagrams from the respective parts of the sub-sample using the value $T_0$ for the bit time, computing two histograms from the two eye diagrams by digitizing the time and the intensity, determining the time period $\delta$ between the two histograms, determining the bit time $T_1$ from the equation:

$$T_1 = T_0 - 2\delta \frac{T_0}{t_k}, \text{ and}$$

repeating the above operations substituting N/2 for N until a sub-sample of K/2 samples is obtained.

This implementation is particularly simple and necessitates only a very approximate initial knowledge of the bit time; furthermore, it computes very accurately the real bit time, which differs greatly from the bit time known initially because of the inaccuracy relating to the signal clock. This implementation also reconstitutes the eye diagram.

In a second implementation of the method of the invention, the bit time relative to the sampling frequency is computed without initially knowing the bit time.

To this end, the following operations are effected:

applying a non-linear function to the series of samples of the signal to obtain a series of substantially periodic values $y_k$ for k varying from 1 to K, dividing the series into M sub-series each of L elements where L and M are integers, computing the discrete Fourier transform of each sub-series, which yields a function $Y_i$ for i varying from 1 to M, defining a periodogram function as the ratio with respect to M of the sum of the squares of the moduli of the functions $Y_i$ for i varying from 1 to M, and determining the frequency f which maximizes the periodogram function.

To compute the eye diagram, the following operations are then effected:

computing the discrete Fourier transform at the frequency f of the series $y_k$, which yields a function $z_k$ for k varying from 1 to K, and obtaining the time associated with each sample of the signal from the equation:

$$\tau_k = \frac{\arg(Z_k)}{2\pi}$$

In an advantageous implementation, the Fourier transform is computed over a sliding window centered on $y_k$. This avoids errors due to cumulative phase jitter affecting the sampling clock or the signal.

This second implementation dispenses completely with the need for any initial knowledge of the bit time, and it improves tolerance to jitter affecting the sampling clock or the signal.

In the invention, when the bit time has been determined and the eye diagram reconstituted by either of the above methods, the error rate is computed by modeling the statistical distributions of the levels of the signal by means of P Gaussian distributions where P is an integer greater than or equal to 2 and preferably equal to 8. This takes better account of the deterministic levels resulting from inter-symbol interference.

Finally, the invention also provides apparatus for implementing the above method, which apparatus comprises:

means for detecting the signal, means for sampling the detected signal at a frequency independent of the bit rate of the signal, means for digitizing samples obtained at the output of the sampling means, and software for processing the digitized samples to compute the bit time and the eye diagram.

The software can also model the statistical distributions of the levels in order to compute the error rate of the signal.

Other features and advantages of the present invention become apparent in the course of the following description of an embodiment of the invention, which is provided by way of illustrative and non-limiting example.

BRIEF DESCRIPTION OF THE DRAWINGS

In the accompanying drawings:

FIG. 1 shows the architecture of apparatus for measuring the error rate of an optical transmission system using a method of the invention, and FIG. 2 shows a typical "eye diagram" of an optical signal.

DETAILED DESCRIPTION OF THE INVENTION

FIG. 1 shows the architecture of apparatus 1 for measuring the error rate of an optical transmission system using a method of the invention, two implementations of which are described below with reference to this figure.

The optical signal S is received by a receiver 10. The receiver 10 includes a PIN photodiode 11 which converts light into voltage. A microwave module 12 then eliminates the DC component of the electrical signal from the photodiode 11. The electrical signal from the module 12 is then amplified by two amplifiers 13 and then filtered by a filter 14. The filtering applied by the filter 14 must be matched to the bit rate to guarantee a good signal-to-noise ratio at the input of the sampler 20.

The amplified and filtered electrical signal S' is then sampled asynchronously in the sampler 20. The sampler includes a sampler head 21 which samples the input signal at a given clock frequency, for example 50 kHz. At the output of the sampler head 21 there is therefore obtained an analog signal which can be treated as a series of impulse responses. Each impulse response has an amplitude that depends directly on the amplitude of the input signal in the sampler head 21.

As can be seen in FIG. 1, the sampler head 21 is connected to means 22 internal to the sampler 20 which provide it, via a cable (not shown), with the necessary power supply and a trigger signal T1 commanding sampling of the input signal. The signal T1 is generated by an internal timebase 220 of the means 22.

The impulse analog signal SE from the sampler head 21 is then digitized in a personal computer (PC) 30 by a digitizer card 31. The internal timebase 220 also supplies a trigger signal T2 to the digitizer card 31.

The digitized data is then stored in the PC 30 and then processed in accordance with the invention by software 32. The processing is effected in three parts: a first part consists in recovering the bit time, a second part consists in reconstituting the eye diagram, and the third part consists in determining the error rate, and thus the quality factor, from the reconstituted eye diagram.

The above three steps are described in detail below for each of the two implementations of a method of the invention.

1$^{st}$ Implementation

1$^{st}$ Part: Recovering the Bit Time and Computing the Eye Diagram

This step in fact amounts to effecting clock recovery in software, which avoids using a costly clock recovery circuit that is not transparent to the transmission bit rate.

In this first implementation of the invention, the absolute bit time is computed from an approximate value To known initially.

To this end, a sub-sample $\tilde{E}$ from the set of samples $x_k$, with k varying from 1 to K, of the sampled signal SE is taken from the sampler head 21. This sub-sample includes K/N elements, where N is an integer power of 2 (typically 32 or 64).

The sub-sample $\tilde{E}$ is divided into two parts $\tilde{E}_1$ and $\tilde{E}_2$.

The eye diagram of each of these two parts, representing the amplitude as a function of time of each sample from the respective parts $\tilde{E}_1$ and $\tilde{E}_2$, is computed using the value $T_0$ for the bit time.

From these two eye diagrams, two histograms $H_1$ and $H_2$ are constructed by digitizing the time and the current. The histograms are identical except for a time period $\delta$.

Let $N_1$ and $N_2$ denote the common sizes of the two histograms on the time and current axes, respectively. The following equation applies for i varying from 0 to $N_1$:

$$C(i) = \sum_{j=1}^{N_1} \sum_{k=1}^{N_2} |H_1((i+j) \bmod N_1, k) - H_2(j, k)|^2.$$

The value of $i_0$ is then determined, where $C(i_0)$ is the greatest of the values C(i), and if $i_0$ is greater than $N_1/2$, then:

$i_0 = i_0 - N_1$, and: $\delta = i_0 * T_0/t_k$.

The bit time $T_1$ is then determined using the equation:

$$T_1 = T_0 - 2\delta \frac{T_0}{t_k}.$$

The above operations are iterated with N/2 substituted for N until a sub-sample of K/2 samples is obtained.

A very accurate estimate of the bit time is then obtained, which circumvents the uncertainty regarding the value $T_0$ known initially.

Note that to estimate very small disturbances of the bit time, it is possible to apply the above operations once only, for N=1.

By means of this method, bit time recovery and eye diagram reconstitution are effected simultaneously. It then remains only to determine the error rate.

Knowing the information relating to the bit time, the phase of each of the samples can be determined and the eye diagram can therefore be reconstituted.

The eye diagram corresponds to a representation of all possible transitions of an optical signal (to be more precise of the electrical signal obtained at the output of the PIN diode), over a period of the signal, i.e. over one bit time. FIG. 2 shows the diagram obtained, which gives the amplitude of the optical signal as a function of time modulo $T_0$. It is called an "eye diagram" because the curve obtained is eye-shaped.

2$^{nd}$ Part: Determining the Error Rate BER

The eye diagram corresponding to optical transmission in the presence of signal degradation, for example amplified spontaneous emission (ASE), but with no inter-symbol interference (ISI), takes account of the widening of the traces on the "1" and "0" levels. Thus an amplitude distribution is associated with each level: amplitude histograms for each of the statistical distributions of the two levels. FIG. 2 shows the associated amplitude frequency histograms alongside the eye diagram of the above kind of signal.

The probability density function for each of the two deterministic levels 1 and 0 is Gaussian. Thus each of the two levels is associated with a standard deviation and with an average value. The error rate BER is determined from these parameters, and is directly related to the quality factory Q by a known equation, as mentioned above.

In the presence of inter-symbol interference, and because of temporal widening caused by chromatic dispersion, for example, the optical pulses can be superposed in amplitude. In this case, to determine the error rate and the Q factor in accordance with the invention, it is preferable to replace the model using two Gaussian distributions described above with a model using eight Gaussian distributions. Account is taken of interference between the bit before and the bit after a given bit, which yields eight deterministic levels (four for the 1 level and four for the 0 level), each of which can be associated with a Gaussian distribution.

The parameters (average and variance) of these eight Gaussian distributions can be estimated using the expectation-maximization (EM) algorithm described, for example, in "Maximum Likelihood for Incomplete Data via the EM Algorithm (with discussion)", Dempster, A. P. Laird, N. M. and Rubin, D. B. (1977), Journal of the Royal Statistics Society, B, 39, 1–38, and is not described in more detail here.

In practice, the eye diagram is divided into N intervals. For each of these intervals, an approximation of the Q factor is computed based on values of the intensities of the samples of the eye diagram. Let Y denote the set of all values of the intensities of a given interval, $M_1$ a median value of the set Y, $Y_0^+$ the subset of values greater than $M_1$, and $Y_0^-$ the subset of values less than $M_1$.

The average $m_0^+$ of the values $Y_0^+$ and the average $m_0^-$ of the values $Y_0^-$ are then computed.

$Y_0^+$ is then defined as the subset of Y such that:

$$|y-m_0^+| \le |y-m_0^-|,$$

and $Y^-$ is defined as the subset of Y such that:

$$|y-m_0^+| > |y-m_0^-|,$$

Finally, $m^+$ and $\sigma^+$, the average and standard deviation of $Y^+$, and $m^-$ and $\sigma^-$, the average and the standard deviation of $Y^-$, are then computed.

The estimated Q factor for the given interval is then given by the equation:

$$Q = \frac{m^+ - m^-}{\sigma^+ + \sigma^-}$$

This yields a set of values Q(j) for j varying from 0 to N, and the value of $j_0$ giving the greatest value of Q(j) is determined. This determines the central slice of the eye diagram.

The error rate is then evaluated by modeling with eight Gaussian distributions over each of the slices on respective opposite sides of the central slice, the averages and variances being again estimated using the EM algorithm mentioned above. The minimum error rate determined in this way corresponds to the optimum Q factor.

The quality factor or Q factor is directly related to the error rate BER by the equation given above. In practice, the method using eight Gaussian distributions computes the error rate directly, and the equivalent Q factor is deduced from the error rate using the equation given above.

$2^{nd}$ Implementation $1^{st}$ Part: Recovering the Bit Time and Computing the Eye Diagram In this second implementation of the invention, the bit time relating to the sampling frequency is computed without initially knowing the bit time. The bit time relating to the sampling frequency is sufficient to reconstitute the eye diagram.

To this end, a non-linear function is first applied to the series of samples $x_k$ of the signal, to obtain a series of substantially periodic values (i.e. values in which the periodic element is strengthened) $y_k$ for k varying from 1 to K. For example:

$$y_k = |x_k - \bar{x}|^p, \text{ where } \bar{x} = \frac{1}{K}\sum_{k=0}^{K-1} x_k.$$

The series obtained in this way is then divided into M sub-series each of L elements (where L and M are integers).

The discrete Fourier transform of each sub-series is then computed, which yields a function $Y_i$ for i varying from 1 to M:

$$Y_i(e^{j\omega}) = \sum_{k=0}^{L-1} y_{iL+k} \cdot e^{-jk\omega}.$$

The periodogram function $P(e^{j\omega})$ is then defined as being the ratio with respect to M of the sum of the squares of the moduli of the functions $Y_i$ for i varying from 1 to M.

The frequency f which maximizes the periodogram function is determined.

By using a sliding window, this algorithm in accordance with the invention for recovering the bit time relating to the sampling frequency avoids errors caused by the cumulative phase jitter of the sampling clock or the signal. The phase jitter of the clock is the uncertainty with respect to the sampling times, which leads to a cumulative time error on each sample. The phase jitter of the signal is inherent to the signal itself.

Then, to compute the eye diagram, the discrete Fourier transform at the frequency f is computed for the series $y_k$, which yields a function $z_k$ for k varying from 1 to K. To this end, the Fourier sum is effected over 2F+1 points centered on the sample $y_k$. Thus a sliding window is used centered on $y_k$ as a function of the sample.

The time associated with each sample $x_k$ of the signal is then given by the equation:

$$\tau_k = \frac{\arg(Z_k)}{2\pi}$$

It is then easy to plot the eye diagram: the sample $x_k$ is at the position $(\tau_k, x_k)$.

In accordance with the invention, by using a sliding window, the above algorithm for recovering the bit time relating to the sampling frequency and reconstituting the eye diagram avoids errors due to the cumulative phase jitter of the sampling clock or the signal. The phase jitter of the clock is the uncertainty with respect to the sampling times, which leads to a cumulative time error on each sample. The phase jitter of the signal is inherent to the signal itself.

$2^{nd}$ Part: Determining the Error Rate BER

Exactly the same method can be used as described with reference to the first implementation.

Of course, the invention is not limited to the implementations described above. Thus double sampling can be employed with a time offset of the order of one bit time between the two sampled signals, instead of single sampling.

Finally, any means described can be replaced by equivalent means without departing from the scope of the invention.

What is claimed is:

1. A method of measuring the error rate of an optical transmission system transmitting a signal, said method comprises detecting said signal, asynchronously sampling said signal at a frequency independent of a bit rate of said signal to obtain K samples of said signal at respective limes $t_1$, to $t_K$ where K is an integer greater than or equal to 2, computing a bit time of said signal, computing an diagram of said signal using the computed bit time of said signal, and computing an error rate of said signal.

2. A method according to claim 1, wherein an absolute bit time is computed from an approximate value $T_0$ that is known initially.

3. A method according to claim 2, wherein a simultaneous computation of the bit time and the eye diagram comprises:

choosing a sub-sample of K/N samples of said signal where N is an integer power of 2, separating said sub-sample into two parts, computing two eye diagrams from respective parts of the sub-sample using the value $T_0$ for the bit time, computing two histograms from the two eye diagrams by digitizing time and intensity, determining the time period δ between the two histograms, determining the bit time $T_1$ from the equation:

$$T_1 = T_0 - 2\delta \frac{T_0}{t_k}, \text{ and}$$

repeating the above operations by substituting N/2 for N until a sub-sample of K/2 samples is obtained.

4. A method according to claim 1, wherein computing the hit time relating to the sampling frequency comprises:

applying a non-linear function to a series of samples of the signal to obtain a series of substantially periodic values $y_k$ for k varying from 1 to K, dividing the series into M sub-series, each of L elements, where L and M are integers, computing a discrete Fourier transform of each sub-series, which yields a function $Y_i$ for i varying from 1 to M, defining a periodogram function as the ratio with respect to M of the sum of the squares of the moduli of the functions $Y_i$ for i varying from 1 to M, and determining the frequency f which maximizes the periodogram function.

5. A method according to claim 4, wherein the computing of the eye diagram comprises:

computing a discrete Fourier transform at the frequency f of the series $y_k$ which yields a function $Z_k$ for k varying from 1 to K, and obtaining a time associated with each sample of the signal from the equation:

$$\tau_k = \frac{\arg(Z_k)}{2\pi}.$$

6. A method according to claim 5, wherein the Fourier transform is computed over a sliding window centered on $y_k$.

7. A method according to claim 1, wherein the error rate is computed by modeling the statistical distributions of levels of said signal by means of P Gaussian distributions where P is an integer greater than or equal to 2.

8. A method according to claim 7, wherein when P is equal to 8, an average and a variance of the eight Gaussian distributions are estimated by applying an expectation-maximization algorithm.

9. Apparatus for measuring the error rate of an optical transmission system transmitting a signal, said apparatus comprising:

means for detecting a signal that has been transmitted by the optical transmission system, means far asynchronously sampling said detected signal at a frequency independent of a bit rate of said signal to obtain K samples of said signal at respective times $t_1$ to $t_k$ where K is an integer greater than or equal to 2, means for digitizing samples obtained at an output of said sampling means, and software for processing said digitized samples to compute a bit time, an eye diagram using the computed bit time, and an error rate of said signal.

10. Apparatus according to claim 9, wherein said software models statistical distributions of levels of the signal in order to compute the error rate of the signal.

11. Apparatus for measuring the error rate of an optical transmission system transmitting a signal, said apparatus comprising:

a detector that detects a signal that has been transmitted by the optical transmission system, a sampler head that asynchronously samples said detected signal at a frequency independent of a the bit rate of said signal to obtain K samples of said signal at respective times $t_1$ to $t_K$ where K is an integer greater than or equal to 2, a digitizer that digitizes samples obtained at an output of said sampler head, and a computer executing software that processes said digitized samples to compute a bit time, an eye diagram using the computed bit time, and an error rate of said signal.

12. Apparatus according to claim 11, wherein said software models statistical distributions of levels of the signal in order to compute the error rate of the signal.

\* \* \* \* \*

UNITED STATES PATENT AND TRADEMARK OFFICE
CERTIFICATE OF CORRECTION

PATENT NO. : 6,744,496 B2
DATED : June 1, 2004
INVENTOR(S) : Olivier Audouin et al.

It is certified that error appears in the above-identified patent and that said Letters Patent is hereby corrected as shown below:

Column 22,
Line 36, Claim 1 should read as follows:
    1. A method of measuring the error rate of an optical transmission system transmitting a signal, said method comprises
        detecting said signal,
        asynchronously sampling said signal at a frequency independent of a bit rate of said signal to obtain K samples of said signal at respective times $t_1$ to $t_k$ where K is an interger greater than or equal to 2,
        computing a bit time of said signal,
        computing an eye diagram of said signal using the computed bit time of said signal, and computing an error rate of said signal.

Signed and Sealed this

Eighteenth Day of January, 2005

JON W. DUDAS
*Director of the United States Patent and Trademark Office*